US010486535B2

(12) United States Patent
Kim et al.

(10) Patent No.: US 10,486,535 B2
(45) Date of Patent: Nov. 26, 2019

(54) APPARATUS AND METHOD FOR PREVENTING OVERHEATING OF CHARGING INLET

(71) Applicants: Hyundai Motor Company, Seoul (KR); Kia Motors Corporation, Seoul (KR)

(72) Inventors: Kyung Su Kim, Gwangju (KR); Gun Seok Yoon, Seoul (KR); Hyeon Jun Kim, Gyeonggi-do (KR); Young Chan Byun, Seoul (KR); Gi Bum Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 223 days.

(21) Appl. No.: 15/831,978

(22) Filed: Dec. 5, 2017

(65) Prior Publication Data
US 2019/0111796 A1    Apr. 18, 2019

(30) Foreign Application Priority Data

Oct. 16, 2017    (KR) .................... 10-2017-0134081

(51) Int. Cl.
*H02J 7/00*      (2006.01)
*B60L 3/04*      (2006.01)
(Continued)

(52) U.S. Cl.
CPC .............. *B60L 3/04* (2013.01); *B60L 53/30* (2019.02); *H02J 7/0027* (2013.01); *H02J 7/027* (2013.01);
(Continued)

(58) Field of Classification Search
USPC ........................................................ 320/109
See application file for complete search history.

(56) References Cited

U.S. PATENT DOCUMENTS

2009/0256523 A1\* 10/2009 Taguchi .................. B60L 58/26
                                                                    320/109
2011/0204849 A1\*  8/2011 Mukai ................... B60L 3/0069
                                                                    320/111
(Continued)

FOREIGN PATENT DOCUMENTS

EP         2995496 A1     3/2016
JP      2011-139572 A     7/2011
(Continued)

OTHER PUBLICATIONS

Extended European Search Report for European Patent Application No. 17204129, dated Jun. 12, 2018, 8 pages.

*Primary Examiner* — Samuel Berhanu
(74) *Attorney, Agent, or Firm* — Mintz Levin Cohn Ferris Glovsky and Popeo, P.C.; Peter F. Corless (57) ABSTRACT

An apparatus and a method for preventing overheating of a charging inlet are provided. The apparatus includes a charging time measuring unit that measures a charging time and a temperature estimating unit that estimates a temperature of the charging inlet based on the measured charging time and a charging parameter. A charging parameter setting unit sets the charging parameter by communicating with a charger and resets the charging parameter to prevent the temperature of the charging inlet from exceeding a threshold temperature.

20 Claims, 6 Drawing Sheets

(51) Int. Cl.
  *B60L 53/30* (2019.01)
  *H02J 7/02* (2016.01)
(52) U.S. Cl.
  CPC ....... *B60L 2230/12* (2013.01); *B60L 2240/36* (2013.01)

(56) References Cited

U.S. PATENT DOCUMENTS

| | | | | |
|---|---|---|---|---|
| 2013/0181675 A1* | 7/2013 | Kawasaki | ............. | B60L 11/185 320/109 |
| 2013/0335024 A1* | 12/2013 | Akai | ............. | H01M 10/44 320/109 |
| 2015/0028809 A1* | 1/2015 | Nishikawa | ............. | H02J 7/0031 320/109 |
| 2015/0171646 A1* | 6/2015 | Pham | ............. | H02J 7/0029 320/109 |
| 2016/0075244 A1* | 3/2016 | Im | ............. | H01R 13/7137 320/107 |
| 2017/0334300 A1* | 11/2017 | Huang | ............. | H02J 7/0045 |

FOREIGN PATENT DOCUMENTS

| | | |
|---|---|---|
| KR | 10-2013-0136290 | 12/2013 |
| WO | 2017/138939 A1 | 8/2017 |

\* cited by examiner

APPARATUS AND METHOD FOR PREVENTING OVERHEATING OF CHARGING INLET

CROSS-REFERENCE TO RELATED APPLICATION

This application is based on and claims the benefit of priority to Korean Patent Application No. 10-2017-0134081, filed on Oct. 16, 2017, the disclosure of which is incorporated herein in its entirety by reference.

TECHNICAL FIELD

The present disclosure relates to an apparatus and a method for preventing overheating of a charging inlet, and more particularly, to a technology of improving the durability of an inlet by preventing the temperature of the inlet from increasing excessively when an electric vehicle is charged.

BACKGROUND

In general, an electric vehicle is a vehicle that is driven by an electric motor using a high-voltage battery, and the high-voltage battery is charged by coupling a charging connector for a charging station to a charging inlet in the electric vehicle. Then, when the charging connector is inserted into and electrically connected to the charging inlet, the high-voltage battery of the electric vehicle is charged by supplying the electric power of the charging station to the high-voltage battery of the electric vehicle after a charging parameter (a voltage or a current) is set through mutual communication. The electric vehicle includes an electric vehicle (EV) and a plug-in hybrid electric vehicle (PHEV).

Recently, chargers that may supply a high output (e.g., 1000 V/200 A) to charging stations have been installed to decrease the charging time of the electric vehicles. When a high current is applied form the high-output charger to the inlet and the cable of the electric vehicle for a substantial period of time, excessive heat may be generated in the inlet and the cable of the electric vehicle, and accordingly, a fire may occur in the electric vehicle since the heat may deteriorate the durability of the inlet and may burn or otherwise damage the cable.

The traditional overheating preventing technology is a technology for preventing overheating of the charging connector for a charging station or preventing overheating of the high-voltage battery mounted on the electric vehicle, and a technology for preventing a charging inlet provided in an electric vehicle has not be suggested. In particular, a technology for estimating the temperature of a charging inlet in an electric vehicle with a high precision based on a charging voltage, a charging current, and a charging time also has not be suggested.

SUMMARY

The present disclosure provides an apparatus and a method for preventing overheating of a charging inlet, in which the durability of a charging inlet may be improved and a fire due to overheating may be prevented in advance by estimating the temperature of the charging inlet based on a charging voltage, a charging current, and a charging time of the electric vehicle and resetting the charging current to prevent the estimated temperature of the charging inlet from exceeding a threshold temperature.

The objects of the present disclosure are not limited to the above-mentioned ones, and the other unmentioned objects and advantages of the present disclosure will be understood by the following description, and will be understood clearly by the exemplary embodiments of the present disclosure. Further, it is noted that the objects and advantages of the present disclosure will be implemented through the means described in the claims and a combination thereof.

In accordance with an aspect of the present disclosure, an apparatus for preventing overheating of a charging inlet may include a charging time measuring unit configured to measure a charging time, a temperature estimating unit configured to estimate a temperature of the charging inlet based on the measured charging time and a charging parameter, and a charging parameter setting unit configured to set the charging parameter by communicating with a charger and to reset the charging parameter to prevent the temperature of the charging inlet from exceeding a threshold temperature.

In particular, the charging parameter may include a charging voltage and a charging current, and the apparatus may further include a storage configured to store a map in which temperature of the charging inlet based on charging times and charging currents for respective charging voltages are recorded. The temperature estimating unit may be configured to estimate the temperature of the charging inlets using the map in which the temperature of the charging inlet based on charging times and charging currents for respective charging voltages are recorded.

The charging parameter setting unit may be configured to reset the charging current to adjust the temperature of the charging inlet. The charging parameter setting unit may then be configured to decrease the charging current when the temperature of the charging inlet exceeds a threshold temperature. Additionally, the charging parameter setting unit may be configured to linearly decrease the charging current. The charging parameter setting unit may be configured to return the charging current to an original value when the temperature of the charging inlet is decreased to a reference temperature or less after the charging current is reduced. The apparatus may further include a temperature comparing unit configured to compare the temperature of the charging inlet estimated by the temperature estimating unit with a threshold temperature. The temperature comparing unit may then be configured to determine whether the temperature of the charging inlet estimated by the temperature estimating unit exceeds the threshold temperature.

In accordance with another aspect of the present disclosure, a method for preventing overheating of a charging inlet may include setting a charging parameter by communicating with a charger, measuring a charging time, estimating a temperature of the charging inlet based on the set charging parameter and the measured charging time, and resetting the charging parameter to prevent the temperature of the charging inlet from exceeding a threshold temperature.

The charging parameter may include a charging voltage and a charging current. The method may further include storing in a map temperature of the charging inlet based on charging times and charging currents for respective charging voltages. The estimating of the temperature of the charging inlet may include estimating the temperature of the charging inlets using the map in which the temperature of the charging inlet based on charging times and charging currents for respective charging voltages are recorded.

The resetting of the charging parameter may include resetting the charging current to adjust the temperature of the charging inlet. The resetting of the charging parameter may include decreasing the charging current when the temperature of the charging inlet exceeds the threshold temperature. Additionally, the resetting of the charging parameter may include linearly decreasing the charging current. The resetting of the charging parameter may include returning the charging current to an original value when the temperature of the charging inlet is decreased to a reference temperature or less after the charging current is reduced.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Figure 1:
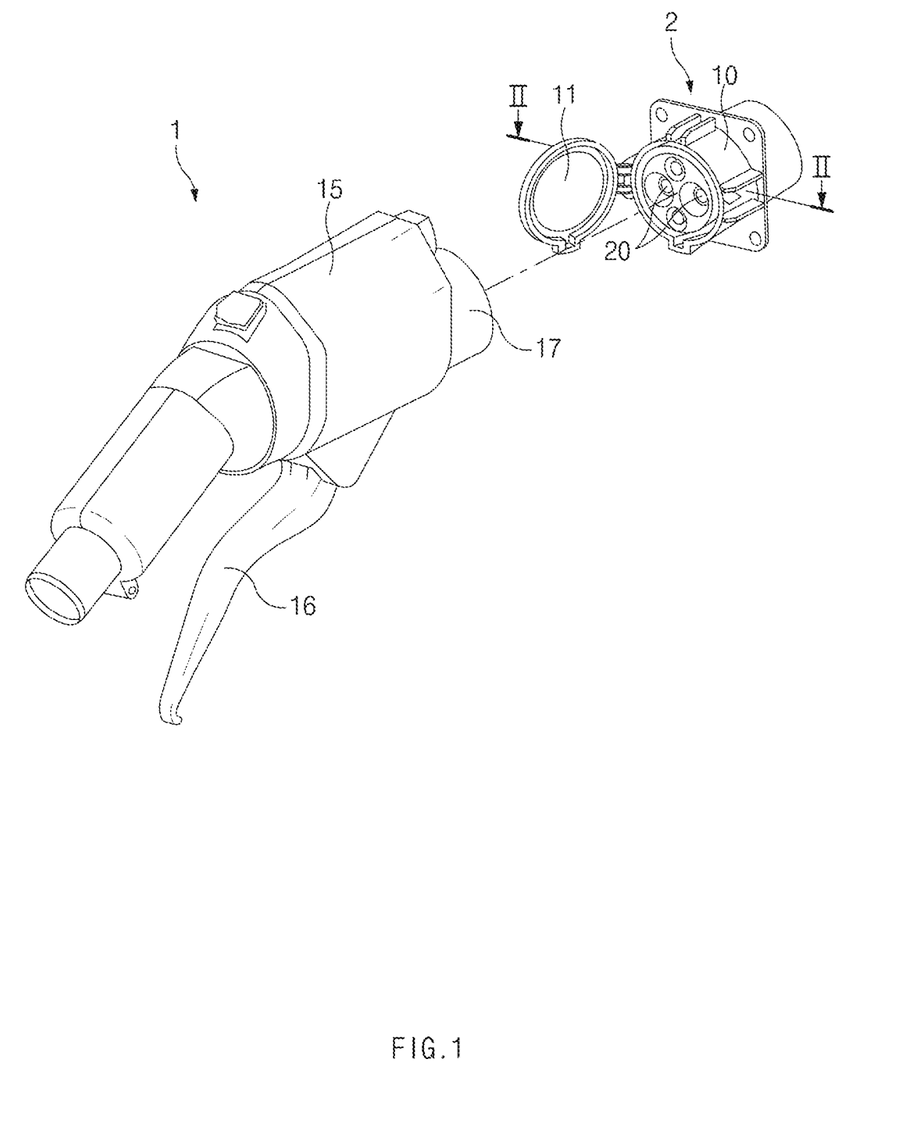
FIG. 1 is a perspective view illustrating a structure of a charging inlet of an electric vehicle and a charging connector according to an exemplary embodiment of the present disclosure.
Figure 2:
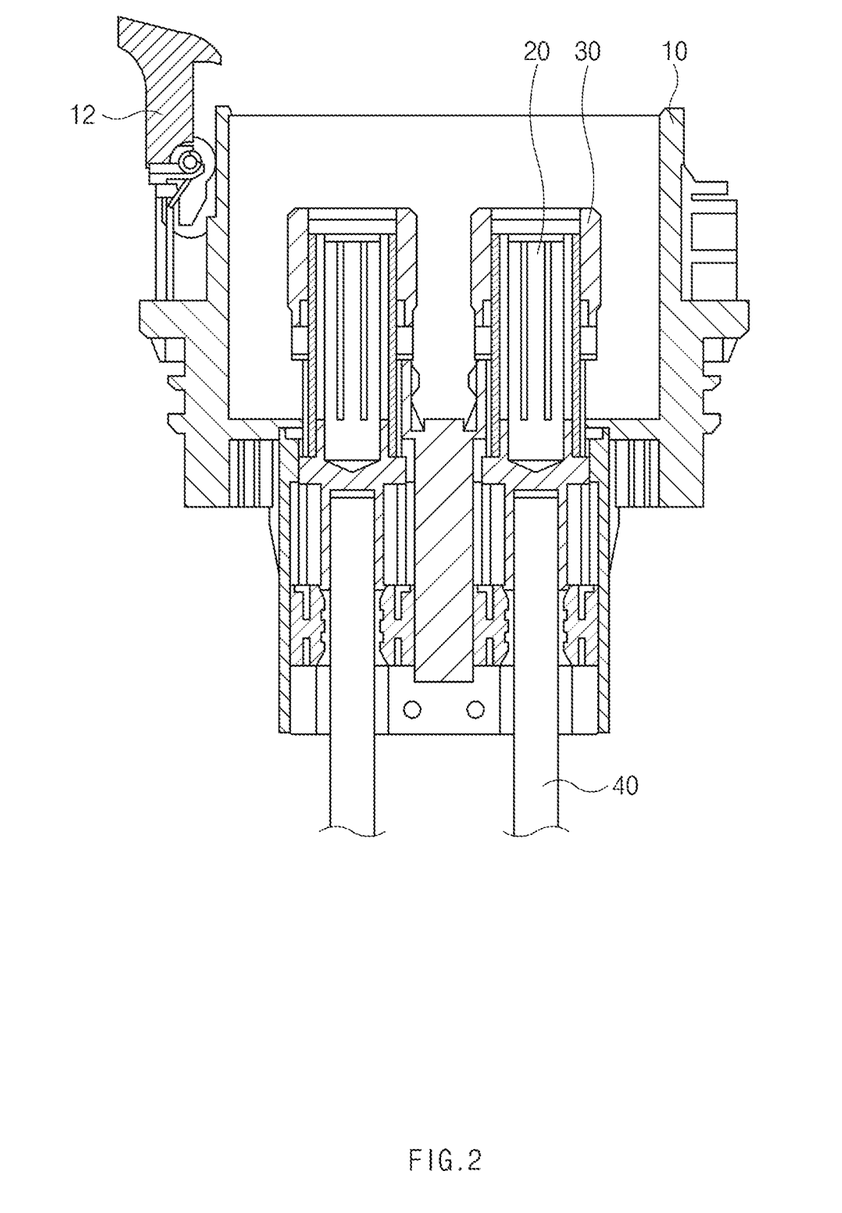
FIG. 2 is a sectional view illustrating a structure of the inlet, taken along line II-II of FIG. 1 according to an exemplary embodiment of the present disclosure.

FIG. 1 is a perspective view illustrating a structure of a charging inlet of an electric vehicle and a charging connector according to an exemplary embodiment of the present disclosure. FIG. 2 is a sectional view illustrating a structure of the inlet, taken along line II-II of FIG. 1. As illustrated in FIGS. 1 and 2, a charging inlet (inlet device) 2 for an electric vehicle according to the present disclosure may include an outer housing 10 installed on one side of the electric vehicle with an inner surface thereof exposed to the outside of the vehicle, an inlet terminal 20 installed on an inner surface of the outer housing 10 to protrude to a specific height to receive electric power, an inner housing 30 disposed in the interior of the outer housing 10 while surrounding the inlet terminal 20 to protect the inlet terminal 20 from an external impact, and a cable 40 that electrically connects the inlet terminal 20 to a high-voltage battery (not illustrated) disposed on one side of the interior of the electric vehicle.

In particular, the outer housing 10 may be a cylindrical member, one side surface (e.g., a first side surface) of which may be opened and the interior of which may have a specific space (e.g., cavity), and a separate cover 11 that may selectively open and close an opened upper surface of the outer housing 10 may be coupled to one side of the outer surface of the outer housing 10 to be rotatable. A stopping member 12 that may maintain a state in which the cover member 11 shields the upper surface of the outer housing 10 may be coupled to the outer surface of the outer housing 10 on a side that is opposite to a side to which the cover member 11 is coupled to be rotatable (e.g., a second side surface), to rotate the stopping member 12.

The inlet terminal 20 may protrude from a bottom surface of the external housing 10 to a specific height and may be connected to a charging terminal (not illustrated) provided in the charging connector 1 to receive electric power, and the inner housing 30 may be disposed on an outer surface of the inlet terminal 20. The inner housing 30 may be a cylindrical member, an upper surface of which may be opened such that the cylindrical member protects an external appearance of the inlet terminal 20 and connects the inlet terminal 20 to the charging terminal and the interior of which has an accommodation space in which the inlet terminal 20 may be accommodated. The cable 40 may electrically connect the inlet terminal 20 and the high-voltage battery disposed on one side of the interior of the electric vehicle.

A process of charging a battery of the electric vehicle by inserting the charging connector into the inlet having the above-described structure is as follows. First, when the charging connector 1 is inserted into the outer housing 10 after the cover member 11 disposed on one side of the outer housing 10 is rotated to expose the interior of the outer housing 10 to the outside of the vehicle, the charging terminal disposed in the charging connector 1 and the inlet terminal 20 protruding from the bottom surface of the outer housing 10 may be coupled to each other. When electric power is supplied in a state in which the charging terminal and the inlet terminal 20 are coupled to each other, the electric power may be delivered to the inlet terminal 20 via the charging terminal, and the electric power may be supplied to the high-voltage battery of the electric vehicle through the cable 40 connected to the inlet terminal 20.

Meanwhile, the charging connector 1 may include a body part 15 in which the charging terminal connected to a power source is installed, a rotatable lever 16 disposed on one side of the body 15 to selectively supply electric power, and an outlet part 17 that protrudes from an end of the body 15 and inserted into the inlet 2 of the electric vehicle to connect the inlet terminal 20 disposed in the interior of the inlet 2 and the charging terminal. The body part 15 may have a curved shape such that the user inserts the charging connector 1 into the inlet 2 of the electric vehicle while gripping the member when the electric vehicle is charged, and the charging terminal connected to the power source may be installed in the interior of the body part 15.

The rotatable lever 16 may be disposed on one side of the body part 15 to be rotatable, and electric power may be selectively supplied to the charging terminal through rotation of the rotatable lever 16. In other words, electric power may be supplied to the charging terminal when the rotatable lever 16 is attached to the body part 15, and the electric power supplied to the charging terminal may be interrupted when the rotatable lever 16 is rotated in a direction away from the body part 15. The outlet part 17 may be installed at an end of the body part 15 to have a diameter that is less than the diameter of the body part 15 and may protrude by a specific length, and when the electric vehicle is charged, an outer peripheral surface of the outlet part 17 may be inserted into the inlet 2 to contact the inner peripheral surface of the inlet 2 in the electric vehicle.

Figure 3:
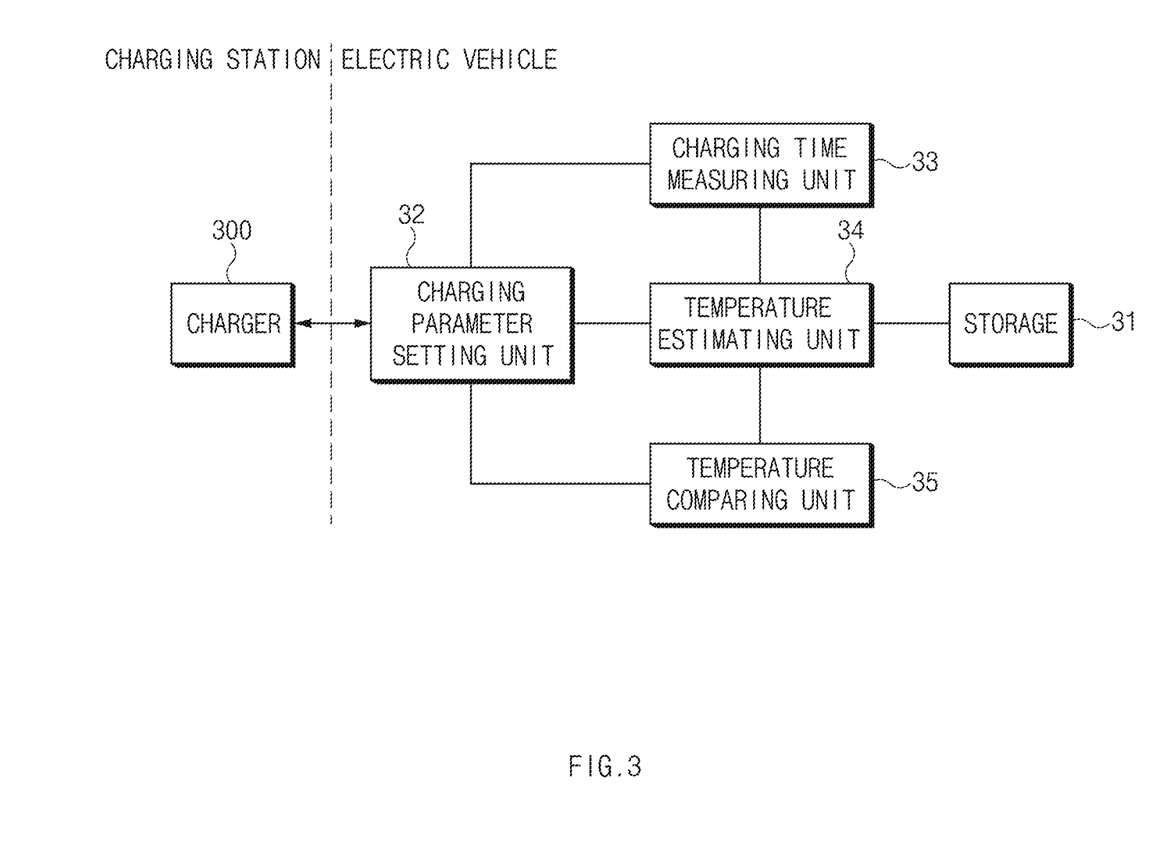
FIG. 3 is a block diagram of an apparatus for preventing overheating of a charging inlet according to an exemplary embodiment of the present disclosure.

FIG. 3 is a block diagram of an exemplary embodiment of an apparatus for preventing overheating of a charging inlet according to the present disclosure. As illustrated in FIG. 3, the apparatus for preventing overheating of a charging inlet according to the present disclosure may include a storage 31, a charging parameter setting unit 32, a charging time measuring unit 33, a temperature estimating unit 34, and a temperature comparing unit 35. The various units may be operated by a controller of the vehicle. In a description of the elements, first, the storage 31 may be configured to store a map in which temperatures of the charging inlet based on charging times and charging currents for respective charging voltages are recorded. The temperature value of the charging inlet may be derived through experiments, and in particular, a derivation result may be classified using an interpolation method.

Further, the charging parameter setting unit 32 may be configured to set a charging parameter by communicating with a charger of a charging station during the charging operation. The charging parameter may include a charging voltage and a charging current. The charging parameter setting unit 32 may then be configured to reset the charging parameter to prevent the temperature of the charging inlet from exceeding a threshold temperature (e.g., about 95° C.). The reset parameter may be a charging current.

In other words, the charging parameter setting unit 32 may be configured to decrease the charging current when the temperature of the charging inlet estimated by the temperature estimating unit 34 exceeds the threshold temperature according to the comparison result from the temperature comparing unit 35. For example, in response to determining that the temperature of the charging inlet exceeds the threshold temperature while a charging operation is performed at about 200 A, the charging current may be reset to less than about 200 A. Then, the charging parameter setting unit 32 may be configured to linearly decrease the charging current.

Further, the charging parameter setting unit 32 may be configured to return the charging current to an original value when the temperature of the charging inlet newly estimated by the temperature estimating unit 34 is decreased to a reference temperature (e.g., about 80° C.) or less after the charging current is reduced. The charging time measuring unit 33 may further be configured to measure a time (charging time) for which the charging operation is performed based on the charging parameter set by the charging parameter setting unit 32. In other words, the charging time measuring unit 33 may be a type of timer, and may be configured to count a charging time from a time at which the charging operation starts and a time at which the charging operation ends. Accordingly, the charging time measuring unit 33 may be configured to detect a lapse of the time from the start of the charging operation in unit of minutes in real time.

The temperature estimating unit 34 may be configured to estimate the temperature of the charging inlet based on the temperature values of the charging inlet according to charging times and charging currents for respective charging voltages, which are stored in the storage 31. In other words, the temperature estimating unit 34 may be configured to detect the charging voltage and the charging current set by the charging parameter setting unit 32 and detect the charging time through the charging time measuring unit 33. Additionally, the temperature estimating unit 34 may be configured to estimate the temperature of the charging inlet based on the temperature values of the charging inlet based on charging times and charging currents for respective charging voltages, which are stored in the storage 31.

The temperature comparing unit 35 may then be configured to compare the temperature of the charging inlet estimated by the temperature estimating unit 34 with a threshold temperature (e.g., about 95° C.) and transmit the result to the charging parameter setting unit 32. In other words, when the temperature of the charging inlet estimated by the temperature estimating unit 34 exceeds a threshold temperature (e.g., about 95° C.), the temperature comparing unit 35 may be configured to provide a notification to the charging parameter setting unit 32 regarding the charging inlet temperature.

Further, the charging parameter setting unit 32 may then be configured to reset the charging parameter to prevent the temperature of the charging inlet from exceeding a threshold temperature. The charging parameter setting unit 32 may be configured to directly perform the function of the temperature comparing unit 35 without including the temperature comparing unit 35. The durability of the charging inlet may be improved and a fire due to overheating may be prevented in advance as well by preventing the temperature of the charging inlet from increasing excessively through the operations of the above-described elements.

Although an example of individually realizing the elements has been described in the embodiment of the present disclosure, a controller in the apparatus for preventing overheating of the charging inlet may perform all the functions of the elements. Of course, the processor may perform all the functions of the elements based on a program for preventing overheating of the charging inlet.

Figure 4:
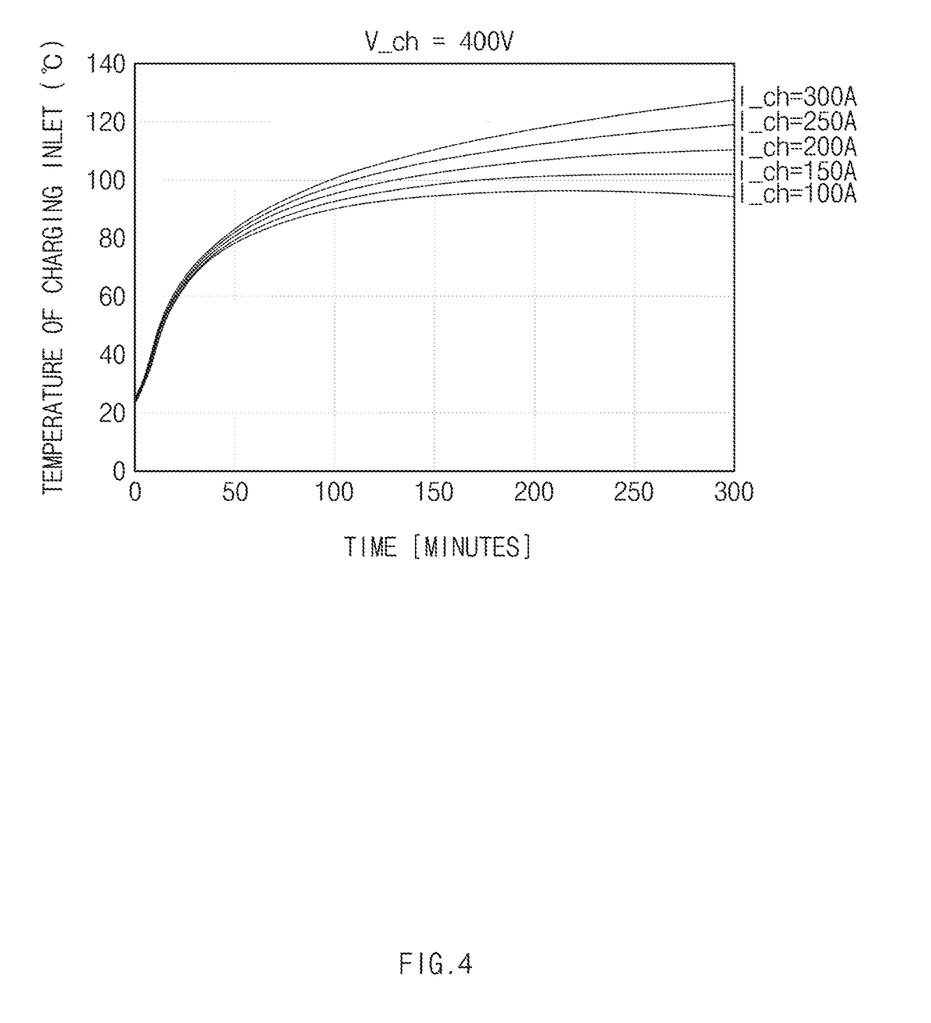
FIG. 4 is an exemplary view illustrating a change rate of the temperature of a charging inlet depending on a charging time and a charging current according to an exemplary embodiment of the present disclosure.

FIG. 4 is an exemplary view illustrating a change rate of the temperature of a charging inlet based on a charging time and a charging current according to the present disclosure. As illustrated in FIG. 4, the transverse axis represents a charging time (minutes) and the longitudinal axis represents a temperature of the charging inlet. Accordingly, the temperatures of the charging inlet according to charging times for respective charging currents may be detected.

The graph of FIG. 4 for respective charging current corresponds to a charging voltage of 400 V, and in FIG. 4, "I-ch=100 A" is a graph that represents the temperature of the charging inlet based on charging times when the charging voltage is 400 V and the charging current is 100 A. "I_ch=150 A" is a graph that represents the temperature of the charging inlet based on charging times when the charging voltage is 400 V and the charging current is 150 A. "I_ch=200 A" is a graph that represents the temperature of the charging inlet based on charging times when the charging voltage is 400 V and the charging current is 2000 A. "I_ch=250 A" is a graph that represents the temperature of the charging inlet based on charging times when the charging voltage is 400 V and the charging current is 250 A. "I_ch=300 A" is a graph that represents the temperature of the charging inlet based on charging times when the charging voltage is 400 V and the charging current is 300 A.

Although five graphs for respective charging currents are illustrated in the present disclosure, the number does not influence the present disclosure at all. For example, the graph of 175 A may be estimated based on a generally widely known interpolation. In particular, the interpolation may include a linear interpolation, an exponential interpolation, a bilinear interpolation, or a spline interpolation. Further, although a graph for respective charging currents when the charging voltage is 400 V, graphs for respective currents according to charging voltages may be provided.

Figure 5:
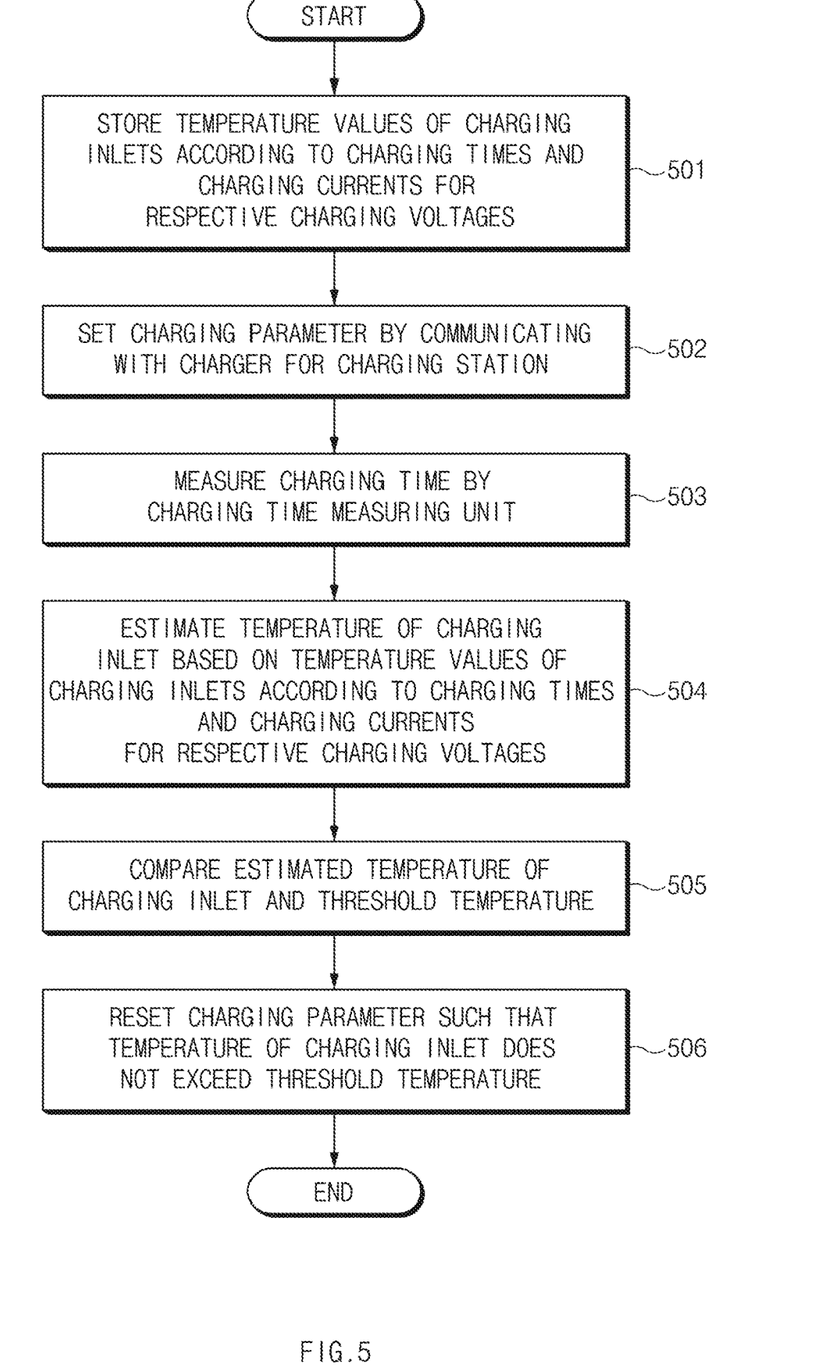
FIG. 5 is a flowchart of a method for preventing overheating of a charging inlet according to an exemplary embodiment of the present disclosure.

FIG. 5 is a flowchart of an exemplary embodiment of a method for preventing overheating of a charging inlet according to the present disclosure. First, the storage 31 may be configured to store temperature values of the charging inlet based on charging times and charging currents for respective charging voltages (501). The temperature values of the charging inlet based on the charging times and the charging currents may be stored in the form of a table, but a plurality of table may be generated for respective charging voltages.

Thereafter, the charging parameter setting unit 32 may be configured to set a charging parameter by communicating with a charger for a charging station (502). This corresponds to an initial setting process that is automatically performed when the charging connector for a charging station is connected to an inlet in the electric vehicle, and is a general technology. Thereafter, the charging time measuring unit 33 may be configured to measure a charging time (503). Notably, the charging time measuring unit 33 may also be a sensor.

Thereafter, the temperature estimating unit 34 may be configured to estimate a temperature of the charging inlet based on the temperature values of the charging inlet according to charging times and charging currents for respective charging voltages (504). Thereafter, the temperature comparing unit 35 may be configured to compare the estimated temperature of the charging inlet with a threshold temperature (505). In other words, the temperature comparing unit 35 may be configured to determine whether the temperature of the charging inlet estimated by the temperature estimating unit 34 exceeds the threshold temperature.

Thereafter, the charging parameter setting unit 32 may be configured to reset the charging parameter to prevent the temperature of the charging inlet from exceeding a threshold temperature (506). In other words, the charging parameter setting unit 32 may be configured to decrease the temperature of the charging inlet by decreasing the charging current when the temperature of the charging inlet exceeds the threshold temperature (e.g., about 95° C.). In addition, the charging parameter setting unit 32 may be configured to return the charging current to an original value when the temperature of the charging inlet is decreased to a reference temperature (e.g., about 80° C.) or less, after decreasing the charging current. Through the process, the durability of the charging inlet may be improved and a fire of the electric vehicle due to overheating may be prevented in advance.

Figure 6:
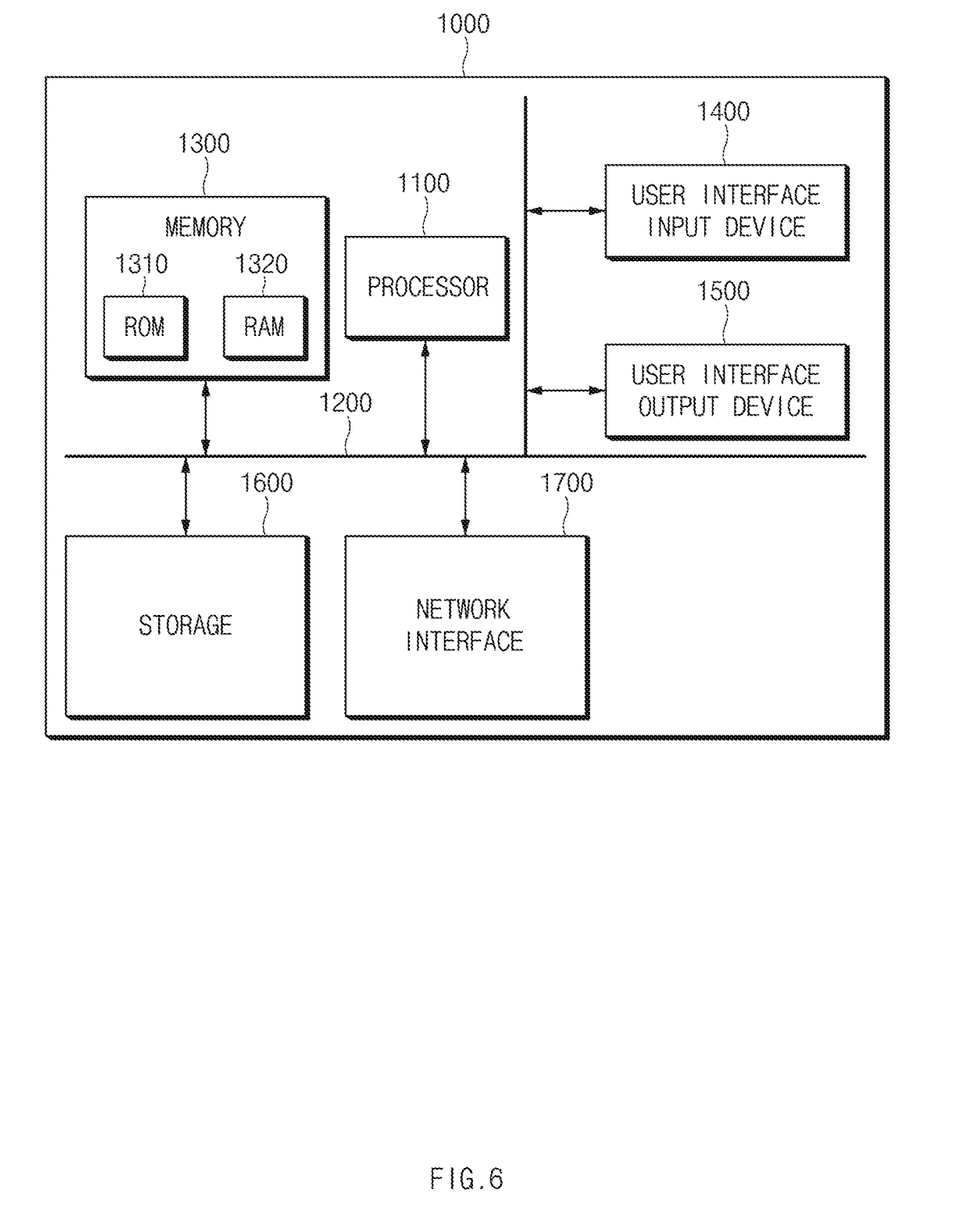
FIG. 6 is a view illustrating an example of a method for realizing a controller of the apparatus for preventing overheating of a charging inlet according to an exemplary embodiment of the present disclosure.

Hereafter, an implementation method of the controller when the elements of the apparatus for preventing overheating of the charging inlet are realized by the controller will be described. FIG. 6 is a view illustrating a method for realizing a controller of the apparatus for preventing overheating of a charging inlet according to the present disclosure. As illustrated in FIG. 6, the controller of the apparatus for preventing overheating of a charging inlet according to the present disclosure may include hardware, software, and a combination thereof. For example, the controller may be realized by a computing system 1000 of FIG. 6.

The computing system 1000 may include at least one processor 1100 connected via a bus 1200, a memory 1300, a user interface input device 1400, a user interface output device 1500, a storage 1600, and a network interface 1700. The processor 1100 may be a central processing unit (CPU) or a semiconductor device configured to execute instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium may be coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the present disclosure, the durability of a charging inlet may be improved by estimating the temperature of the charging inlet based on a charging voltage, a charging current, and a charging time of the electric vehicle and resetting the charging current such that the estimated temperature of the charging inlet does not exceed a threshold temperature. Additionally, a fire due to overheating may be prevented in advance by estimating the temperature of the charging inlet based on a charging voltage, a charging current, and a charging time of the electric vehicle and resetting the charging current to prevent the estimated temperature of the charging inlet from exceeding a threshold temperature.

Further, according to the present disclosure, since the temperature of the charging inlet may be estimated based on a charging voltage, a charging current, and a charging time of the electric vehicle, a temperature sensor is not necessary. Additionally, according to the present disclosure, since a temperature sensor is not necessary, a measure for a breakdown of a temperature sensor is not necessary. Lastly, a stability of the electric vehicle may be secured for consumers by improving the durability of the charging inlet and preventing a fire of the electric vehicle in advance.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed exemplary embodiments of the present disclosure do not limit the technical spirit of the present disclosure but are illustrative, and the scope of the technical spirit of the present disclosure is not limited by the exemplary embodiments of the present disclosure. The scope of the present disclosure should be construed by the claims, and it will be understood that all the technical spirits within the equivalent range fall within the scope of the present disclosure.

What is claimed is:

1. An apparatus for preventing overheating of a charging inlet, comprising:
   a memory configured to store program instructions; and
   a processor configured to execute the program instructions, the program instructions when executed configured to:
   measure a charging time;
   estimate a temperature of the charging inlet based on the measured charging time and a charging parameter, and
   set the charging parameter by communicating with a charger and reset the charging parameter to prevent the temperature of the charging inlet from exceeding a threshold temperature.

2. The apparatus of claim 1, wherein the charging parameter includes a charging voltage and a charging current.

3. The apparatus of claim 2, wherein the memory is configured to store a map in which the temperature of the charging inlet based on charging times and charging currents for respective charging voltages are recorded.

4. The apparatus of claim 3, wherein the program instructions when executed are further configured to estimate the temperature of the charging inlets using the map in which the temperature of the charging inlet based on charging times and charging currents for respective charging voltages are recorded.

5. The apparatus of claim 2, wherein the program instructions when executed are further configured to reset the charging current.

6. The apparatus of claim 5, wherein the program instructions when executed are further configured to decrease the charging current when the temperature of the charging inlet exceeds a threshold temperature.

7. The apparatus of claim 6, wherein the charging current is decreased linearly.

8. The apparatus of claim 6, wherein the charging current is returned to an original value when the temperature of the charging inlet is decreased to a reference temperature or less after the charging current is reduced.

9. The apparatus of claim 1, wherein the program instructions when executed are further configured to compare the estimated temperature of the charging inlet with a threshold temperature.

10. The apparatus of claim 9, wherein the program instructions when executed are further configured to determine whether the estimated temperature of the charging inlet exceeds the threshold temperature.

11. A method for preventing overheating of a charging inlet, comprising:
    setting, by a controller, a charging parameter by communicating with a charger;
    measuring, by the controller, a charging time;
    estimating, by the controller, a temperature of the charging inlet based on the set charging parameter and the measured charging time; and
    resetting, by the controller, the charging parameter to prevent the temperature of the charging inlet from exceeding a threshold temperature.

12. The method of claim 11, wherein the charging parameter includes a charging voltage and a charging current.

13. The method of claim 12, further comprising:
    storing, by the controller, the temperature of the charging inlet in a map based on charging times and charging currents for respective charging voltages.

14. The method of claim 13, wherein the estimating of the temperature of the charging inlet includes:
    estimating, by the controller, the temperature of the charging inlets using the map in which the temperature of the charging inlet based on charging times and charging currents for respective charging voltages are recorded.

15. The method of claim 12, wherein the resetting of the charging parameter includes:
    resetting, by the controller, the charging current.

16. The method of claim 15, wherein the resetting of the charging parameter includes:
   decreasing, by the controller, the charging current when the temperature of the charging inlet exceeds the threshold temperature.

17. The method of claim 16, wherein the resetting of the charging parameter includes:
   linearly decreasing, by the controller, the charging current.

18. The method of claim 16, wherein the resetting of the charging parameter includes:
   returning, by the controller, the charging current to an original value when the temperature of the charging inlet is decreased to a reference temperature or less after the charging current is reduced.

19. The method of claim 11, further comprising:
   determining, by the controller, whether the estimated temperature of the charging inlet exceeds a threshold temperature.

20. A non-transitory computer readable medium containing program instructions executed by a processor for preventing overheating of a charging inlet, the computer readable medium comprising:
   set a charging parameter by communicating with a charger;
   measure a charging time;
   estimate a temperature of the charging inlet based on the set charging parameter and the measured charging time; and
   reset the charging parameter to prevent the temperature of the charging inlet from exceeding a threshold temperature.

* * * * *